(12) United States Patent
Klingemann et al.

(10) Patent No.: US 11,866,036 B2
(45) Date of Patent: Jan. 9, 2024

(54) DRIVER ASSISTANCE SYSTEM FOR A MOTOR VEHICLE, MOTOR VEHICLE AND METHOD FOR OPERATING A MOTOR VEHICLE

(71) Applicant: Volkswagen Aktiengesellschaft, Wolfsburg (DE)

(72) Inventors: Timo Klingemann, Sassenburg (DE); Bastian Schmidt, Wolfsburg (DE); Maike Wall, Braunschweig (DE); Michael Wonke, Braunschweig (DE); Jörn Fauck, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 227 days.

(21) Appl. No.: 16/704,204

(22) Filed: Dec. 5, 2019

(65) Prior Publication Data

US 2020/0180611 A1    Jun. 11, 2020

(30) Foreign Application Priority Data

Dec. 7, 2018    (DE) ..................... 10 2018 221 241.4

(51) Int. Cl.
*B60W 30/09*    (2012.01)
*B60Q 9/00*    (2006.01)
*G08G 1/16*    (2006.01)

(52) U.S. Cl.
CPC ............. *B60W 30/09* (2013.01); *B60Q 9/008* (2013.01); *G08G 1/167* (2013.01)

(58) Field of Classification Search
CPC .. B60W 30/09; B60W 40/09; B60W 30/0956; B60W 50/14; B60W 30/08;
(Continued)

(56) References Cited

U.S. PATENT DOCUMENTS

| 6,571,176 B1 | 5/2003 | Shinmura et al. | ............. 701/301 |
| 6,926,374 B2 | 8/2005 | Dudeck et al. | ............... 303/191 |

(Continued)

FOREIGN PATENT DOCUMENTS

| CN | 101135558 A | 3/2008 | ............. G01C 11/36 |
| CN | 102616235 A | 8/2012 | ............. B60W 30/09 |

(Continued)

OTHER PUBLICATIONS

German Office Action, Application No. 102018221241.4, 6 pages.

*Primary Examiner* — Jeff A Burke
*Assistant Examiner* — Sihar A Karwan
(74) *Attorney, Agent, or Firm* — Slayden Grubert Beard PLLC

(57) ABSTRACT

The invention relates to a driver assistance system for a motor vehicle, the motor vehicle and a method for operating same. In some embodiments, an obstacle is detected based on environmental data and a risk of collision is determined in consideration of driving state data. Further, an evasion trajectory for preventing a collision of the motor vehicle with the obstacle is determined. The driver assistance system is configured to detect another oncoming vehicle for which the risk of collision is greater than a predefined first threshold value as the obstacle. Further, the driver assistance system is configured to check whether a control action of a driver of the motor vehicle is guiding same along the determined evasion trajectory and, if this is not the case, to modify the control action of the driver automatically such that the motor vehicle is guided along the determined evasion trajectory by the modified control action.

15 Claims, 2 Drawing Sheets

(58) Field of Classification Search
CPC ........ B60Q 9/008; G08G 1/167; G08G 1/166;
B60T 2201/022; B60T 2220/02; B60T
2260/06; B60T 8/17558
See application file for complete search history.

(56) References Cited

U.S. PATENT DOCUMENTS

| | | | |
|---|---|---|---|
| 7,109,854 B2 | 9/2006 | Dobler et al. | 340/435 |
| 8,086,406 B2 | 12/2011 | Ewerhart et al. | 701/301 |
| 9,008,957 B2 | 4/2015 | Borchers | 701/301 |
| 9,701,307 B1 | 7/2017 | Newman et al. | |
| 9,840,242 B2 | 12/2017 | Bretzigheimer et al. | |
| 9,855,946 B2 | 1/2018 | Erban et al. | |
| 9,896,073 B2 | 2/2018 | Spencer et al. | |
| 10,065,637 B2 | 9/2018 | Arndt et al. | |
| 10,457,277 B2 | 10/2019 | Bonarens et al. | |
| 2010/0030474 A1 | 2/2010 | Sawada | 701/301 |
| 2014/0309884 A1* | 10/2014 | Wolf | B60W 10/18 701/41 |
| 2015/0183410 A1 | 7/2015 | Ko et al. | 701/96 |
| 2016/0075332 A1 | 3/2016 | Edo-ros | 701/70 |
| 2018/0061230 A1* | 3/2018 | Madigan | G08G 1/012 |
| 2019/0047473 A1* | 2/2019 | Pohl | G08G 1/166 |
| 2019/0049968 A1* | 2/2019 | Dean | G05D 1/0088 |
| 2020/0242922 A1* | 7/2020 | Dulberg | G08G 1/164 |

FOREIGN PATENT DOCUMENTS

| | | | |
|---|---|---|---|
| DE | 10029710 A1 | 1/2001 | B60T 7/22 |
| DE | 10128792 A1 | 11/2002 | B60R 21/00 |
| DE | 102005014803 A1 | 10/2006 | G08G 1/16 |
| DE | 102008040077 A1 | 1/2010 | B60W 30/08 |
| DE | 102009034386 A1 | 2/2010 | B60R 21/00 |
| DE | 102009020649 A1 | 11/2010 | B60W 10/184 |
| DE | 102009047333 A1 | 6/2011 | B60W 30/08 |
| DE | 102012025468 A1 | 7/2014 | B60W 30/08 |
| DE | 102013010004 A1 | 12/2014 | B60W 30/08 |
| DE | 102013225970 A1 | 6/2015 | B60T 7/12 |
| DE | 102014206341 A1 | 10/2015 | B60W 30/08 |
| DE | 102015211276 A1 | 12/2016 | B60T 7/12 |
| DE | 102016210848 A1 | 1/2017 | B60W 30/08 |
| DE | 102016005230 A1 | 2/2017 | B60R 21/0134 |
| DE | 102016213756 A1 | 4/2017 | B60W 30/08 |
| DE | 102016005884 A1 | 11/2017 | B60W 30/08 |
| DE | 102016208604 A1 | 11/2017 | B60W 30/08 |
| DE | 102016213021 A1 | 1/2018 | B60W 30/08 |
| EP | 1303421 B1 | 3/2004 | B60R 21/00 |
| EP | 2043896 B1 | 5/2010 | B60W 10/18 |
| EP | 2302412 A1 | 3/2011 | G01S 13/72 |
| EP | 2189811 B1 | 10/2011 | B60W 30/08 |
| EP | 2500890 A2 | 9/2012 | G06K 9/00 |
| KR | 20130017728 A | 2/2013 | B60R 21/013 |
| KR | 1020150047900 A | 5/2015 | B60R 21/013 |
| WO | 2005/080133 A1 | 9/2005 | B60Q 1/52 |

\* cited by examiner

DRIVER ASSISTANCE SYSTEM FOR A MOTOR VEHICLE, MOTOR VEHICLE AND METHOD FOR OPERATING A MOTOR VEHICLE

CROSS-REFERENCE TO RELATED APPLICATIONS

This application claims priority to German Patent Application DE 10 2018 221 241.4, filed on Dec. 7, 2018 with the German Patent and Trademark Office. The contents of the aforesaid Patent Application are incorporated herein for all purposes.

TECHNICAL FIELD

The invention relates to a driver assistance system for a motor vehicle, to a corresponding motor vehicle comprising a driver assistance system of this kind and to a method for operating a motor vehicle of this kind. The driver assistance system and the method are used to prevent collisions.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In spite of the progress made over recent decades with regard to motor vehicle safety and an increasing prevalence of systems and functions for assisting drivers during driving of motor vehicles, there are still numerous, sometimes deadly, traffic accidents. In order to improve the situation further, DE 10 2013 225 970 A1, for example, proposes a method in which the driving behavior of a vehicle is influenced depending on environmental data. In this method, in the event a risk of collision is identified, a driver-independent braking action is carried out by means of an electronically controlled braking system of the vehicle. The braking system thereby allows for driver-independent build-up of braking forces at the individual wheels of the vehicle. This is ultimately supposed to improve vehicle control and driving stability.

DE 101 28 792 A1 describes a method for preventing a vehicle from colliding with obstacles. An available driving space is calculated from the distance values between the vehicle and the obstacles and this driving space is compared with a required driving space, which is also calculated. When the required driving space goes beyond the available driving space, measures for preventing collisions are taken.

DE 10 2009 034 386 A1 discloses a driving assistance device for a vehicle. The aim is to determine whether an obstacle detected outside the vehicle can be visually identified by the driver or cannot be visually identified by the driver. Further, the aim is to provide driving assistance for preventing a collision with the obstacle, a risk of collision being considered higher for an obstacle that cannot be visually identified by the driver than for an obstacle that can be visually identified by the driver.

SUMMARY

An object of the present invention is to increase road traffic safety. This object is achieved by the subject matter of the independent claims. Embodiments and developments of the present invention are specified in the dependent claims, in the description, and in the figures.

In one aspect, a driver assistance system for a motor vehicle for preventing collisions is provided, which system may comprise a data processing apparatus having a data interface for receiving driving state data of the motor vehicle and environmental data provided by environment sensors and characterizing a current environment of the motor vehicle. The driver assistance system being configured:

to detect a vehicle-external obstacle based on the environmental data and to determine a corresponding risk of collision depending on the driving state data; and to determine an evasion trajectory for preventing a collision of the motor vehicle with the obstacle. The driver assistance system may further be configured to detect another vehicle as the obstacle, which vehicle is approaching the motor vehicle and for which the risk of collision is greater than a predefined first threshold value; and to check whether a control action of a driver of the motor vehicle is guiding same along the determined evasion trajectory and, if this is not the case, to modify the control action of the driver automatically such that the motor vehicle is guided along the determined evasion trajectory by the modified control action.

The details of one or more embodiments are set forth in the accompanying drawings and the description below. Other features will be apparent from the description, drawings, and from the claims.

DETAILED DESCRIPTION

Figure 1:
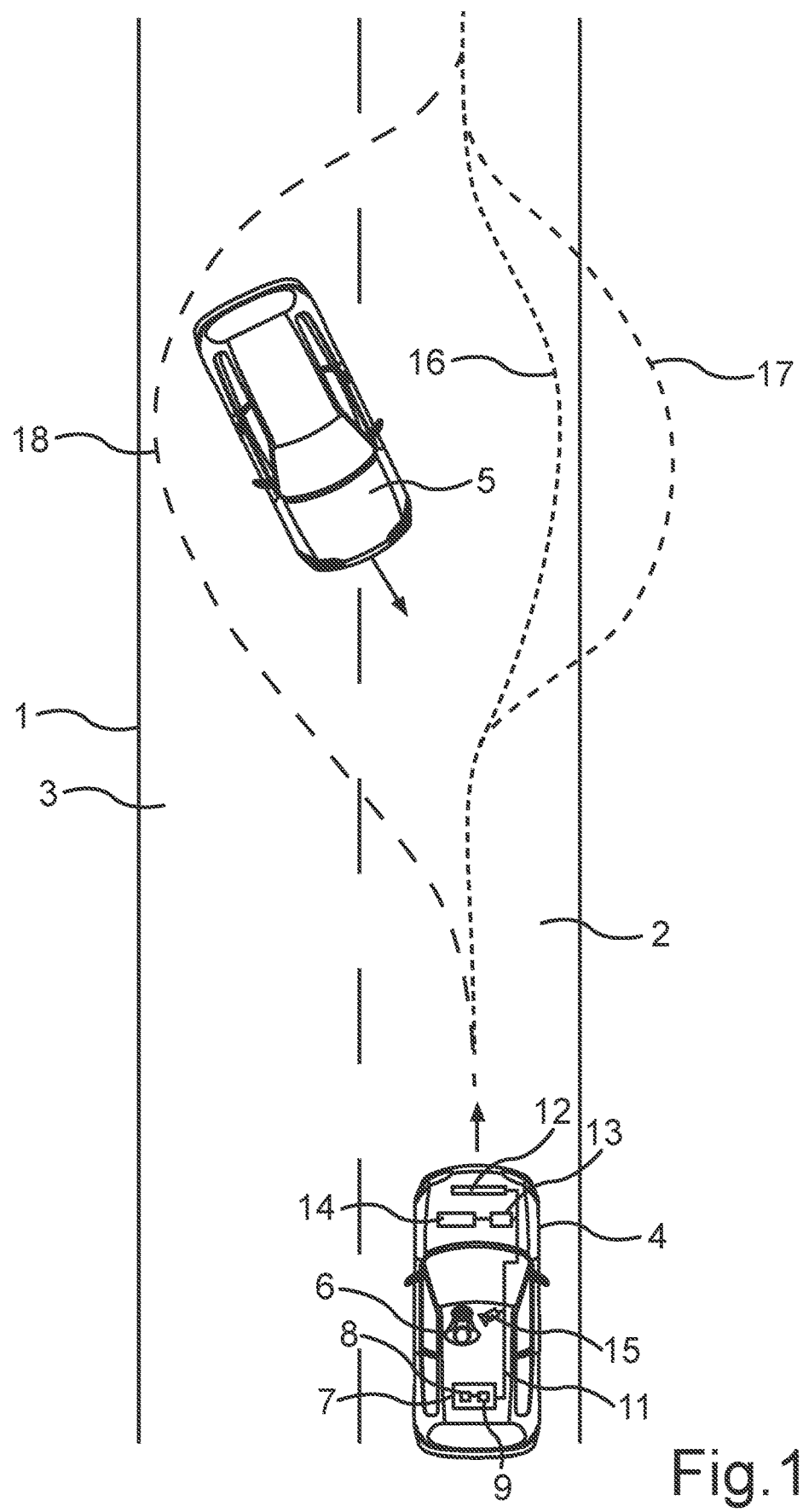
FIG. 1 is a schematic plan view of a traffic scene with a motor vehicle comprising a driver assistance system for preventing collisions and with another vehicle posing a risk of collision.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one exemplary aspect, a driver assistance system for a motor vehicle is used, i.e., is configured, to prevent collisions, i.e., to assist a driver of the motor vehicle or to assist with operation of the motor vehicle with the aim of preventing a collision of the motor vehicle. For this purpose, the driver assistance system of this aspect may comprise a data processing apparatus having a data interface for receiving driving state data of the motor vehicle and environmental data provided by environment sensors.

The driving state data characterize or describe a driving state of the motor vehicle, for example its speed, direction of travel, steering angle, engine load, loading, equipment and/or the like. The driving state data may be requested, for example from an on-board network, for example from additional apparatuses or systems of the motor vehicle, or determined from data available therein, by the driver assistance system, in particular the data processing apparatus. Static parts of said data or properties which characterize or indicate the motor vehicle or driving behavior thereof, e.g., may be predefined and stored, for example, in a memory apparatus of the driver assistance system or data processing apparatus.

The environmental data may characterize a current environment of the motor vehicle. For example, the environmental data may indicate distances from one or more objects or obstacles in the environment of the motor vehicle, a course of a traffic route currently being traveled by the motor vehicle, at least one feature of road equipment in the environment of the motor vehicle, corresponding relative speeds of the motor vehicle, environmental conditions, such as a type and/or state of a road surface and/or a weather condition, and/or the like. For this purpose, the environment sensors may, for example, be or comprise a camera, a radar, lidar, ultrasound and/or laser scanner apparatus and/or the like. The environment sensors may be part of the driver assistance system or part of the motor vehicle and, in the latter case, be connected to the driver assistance system, in particular the data processing apparatus, via the on-board network of the motor vehicle. The data interface may be a master unit or apparatus, i.e., it may comprise a plurality of individual interfaces, for example.

The driver assistance system according to the present aspect is thereby configured to detect or identify at least one vehicle-external obstacle, located in the current environment of the motor vehicle, using the environmental data, and depending on the driving state data, to determine a corresponding risk of collision, i.e., a risk or probability of a collision of the motor vehicle with the detected or identified obstacle. For this purpose, a trajectory of the motor vehicle and, if applicable, of the obstacle, can for example be determined and continued or extrapolated. Equally, a model of the motor vehicle, for example, may be predefined and the movement thereof can be simulated or modeled in consideration of the driving state data and, if applicable, the environmental data. For example, a driving path comprising possible future positions of the motor vehicle may be determined. A risk of collision can then be assumed if the obstacle is located in the driving path of the motor vehicle or if the obstacle is likely to intercept the driving path based on a movement of the obstacle itself or a relative movement between the motor vehicle and the obstacle.

The driver assistance system is further configured to determine at least one evasion trajectory for the motor vehicle for preventing a collision of the motor vehicle with the obstacle. The evasion trajectory thus indicates a possible path which the motor vehicle can follow and which will likely lead the vehicle past the obstacle without causing a collision. The evasion trajectory may therefore be a line within the driving path. The driving state data, for example, and, if applicable, the environmental data, may be considered in order to determine the evasion trajectory. For example, possible evasion trajectories, i.e., travel trajectories that the motor vehicle can actually drive along or follow in a particular situation, may be limited by the properties and capabilities of the motor vehicle. Therefore, possibly depending on the speed, it may not be possible to set a steering angle of the motor vehicle or to set same as quickly as desired or to any desired values and it may not be possible to alter the speed of the motor vehicle as quickly as desired. This not only depends on the current state and equipment of the motor vehicle, but potentially also on the environmental conditions, for example a road surface. By considering corresponding data, in this case the driving state data and/or the environmental data for example, the driving path and evasion trajectory may be determined in a particularly accurate and particularly reliable manner.

According to the present aspect, the driver assistance system is configured to detect another vehicle which is approaching the motor vehicle and for which the risk of collision is greater than a predefined first threshold value as the obstacle. For this purpose, the risk of collision may for example be determined as a probability. The present aspect thus aims to prevent frontal collisions in particular. On account of the high relative speeds that are typically involved, during prevention of said frontal collisions, safety can be improved in a particularly effective manner by means of the driver assistance system of the present aspect. Further, according to the present aspect, the driver assistance system may be configured to check whether a control action of a driver of the motor vehicle is guiding or will likely guide the motor vehicle along the determined evasion trajectory and, if this is not the case, to modify the control action of the driver automatically such that the motor vehicle is guided along the determined evasion trajectory or kept on the evasion trajectory by means of the modified control action.

A control action in this context is an action, for example prompted or caused by a corresponding operation, operating command or control command, which influences a movement of the motor vehicle. For example, the control action may be a steering action, i.e., a change of a steering turn or steering angle. In order to modify the control action, the driver assistance system may for example vary a value or variable of a corresponding control signal or control command or generate or superimpose an additional control signal or an additional control command. In modern motor vehicles, a connection or link between an operating element and a motor vehicle apparatus that is ultimately actuated or influenced by said operating element, for example between a steering wheel or a pedal on the one hand and the wheels, engine and/or a braking system of the motor vehicle on the other, is often not exclusively mechanical. Rather, said connection or link may at least comprise sections over which only data signals and no direct mechanical force is transmitted (steer-by-wire). Additionally or alternatively, electrical, electromotive, electromechanical or electrohydraulic apparatuses may for example be integrated in the connection or link or engage thereon. Examples of this include power steering, engine control units, brake boosters, traction control and/or the like. On account of these sections or apparatuses in particular, it is therefore possible to modify the control action of the driver or the actual effect thereof on a movement or driving state of the motor vehicle. This is transparent to the driver, and is therefore not necessarily or readily perceived by the driver.

For example, by means of the driver assistance system, a steering torque or steering angle, an acceleration or braking force or braking-force distribution or the like can be modified, adapted or set. The driver assistance system or a corresponding modification apparatus of the driver assistance system may for example be wired to the connection or link, i.e., a functional chain between the at least one operating element and an apparatus of the motor vehicle that implements the eventual movement or eventual driving state of the motor vehicle. The driver assistance system or modification apparatus can then, for example, receive the control action or control command, modify same and then forward same modified along the connection, link or functional chain. Equally, the driver assistance system or modification apparatus may monitor the control action, for example, and for the purpose of the modification actuate the relevant apparatus of the motor vehicle, for example a steering system, the power steering, the engine or an engine control unit, a braking system or the brake booster or the like, by means of an additional control command, such that a modification of the control action of the driver is effectively produced. In particular in stressful situations, such as in the event of a potentially imminent collision, the driver may steer the vehicle too weakly or too strongly or too quickly or too slowly or, for example during said steering of the vehicle, not facilitate an actual change of an orientation or direction of travel of the motor vehicle by means of additional measures, for example a load change, braking or acceleration procedure. As a result, the collision, which from a purely physical point of view can be prevented, may not be prevented or the motor vehicle may get out of control during evasion or an evasion maneuver. Corresponding inaccuracies are compensated or offset by means of the present driver assistance system by modifying the control action. The determined evasion trajectory may for example be conceived as an ideal line that is optimized with regard to collision prevention and driving stability or vehicle stability.

A benefit is that the driver can maintain basic control over the motor vehicle and, at the same time, the motor vehicle is guided or moved safely and reliably. Because the driver is thus not necessarily completely excluded from command or control of the motor vehicle, safety can be improved in spite of the technology not being sufficiently developed to allow for fully autonomous or fully automated guiding of the motor vehicle and in spite of corresponding legal restrictions, and acceptance of supportive or partially automated driver assistance systems can thereby also be improved at the same time, which also increases safety during traffic events.

The proposed driver assistance system beneficially makes it possible to react to other approaching vehicles, regardless of whether these are illegally occupying or driving in a lane used by the motor vehicle or the motor vehicle is illegally using a lane intended for travel in the opposite direction or if the motor vehicle and the other vehicle are driving in a region without road or lane markings.

In some embodiments, the driver assistance system may be configured, upon identification of the risk of a collision and to further improve safety and further support the driver, to trigger or activate at least one passive safety system of the motor vehicle or bring same into a state of increased responsiveness that enables quicker activation or quicker development of the effects in comparison to a standard state provided in non-hazardous driving situations. This may for example relate to a seat belt tensioner, such that a seat belt can be tensioned automatically prior to the evasion. Equally, a pressure in a braking system of the motor vehicle may for example be built up or increased preemptively or a distance between a brake disk and a brake pad may for example be reduced.

In some embodiments, the driver assistance system is configured to detect a plurality of obstacles in the environment, if present, and to track the movement or movements thereof relative to the motor vehicle. Further, the driver assistance system may be configured to then determine a relevant evasion trajectory for those of the obstacles for which a probability of collision other than zero has been determined and to continuously update said evasion trajectory if the relevant probability of collision is less than the predefined first threshold value. In other words, the driver assistance system is thus configured, for obstacles in the environment of the motor vehicle that potentially pose a risk of collision, to preemptively predict trajectory vectors or trajectories thereof relative to the motor vehicle and to determine possible reactions. Since this is already provided, i.e., occurs, in the present case, there is usually enough time to carry out a particularly accurate prediction and to determine a particularly reliable and safe evasion trajectory, if applicable for different scenarios or developments, before the probability of collision reaches or exceeds the first threshold value. This way, it may be ensured that a calculated or determined evasion trajectory is available for every obstacle posing a risk of collision as soon as the relevant probability of collision reaches or exceeds the first threshold value. This then makes it possible for the driver assistance system to react faster, as a result of which safety can further be increased. Therefore, according to the present aspect, the driver assistance system may not carry out or modify a control action influencing the movement or driving state of the motor vehicle as long as the first threshold value is not reached or exceeded or exceeded by at least one probability of collision for at least one of the detected obstacles.

In other embodiments, the driver assistance system is configured to automatically determine whether a reduction of a transverse overlap between the motor vehicle and obstacle that is sufficient for preventing a collision or reducing the impact of the collision on the driver can be achieved by means of a control action, for example the control action of the driver, the modified control action or a fully automated control action, i.e., carried out by the driver assistance system. The driver assistance system may further be configured, if this is not the case, i.e., if sufficient reduction of the transverse overlap cannot be achieved, to then inhibit or prevent control actions, for example steering actions, which would lead to an insufficient reduction of the transverse overlap. A reduction of the transverse overlap corresponds to an increase of a transverse or lateral offset between the motor vehicle and the obstacle. In the process, the current dynamics of the relevant situation, i.e., the speed, direction of movement, driving or operating state of the motor vehicle, a relative movement between the motor vehicle and the obstacle, as well as the environmental data, i.e., road conditions, and/or, if applicable, additional data received via a wireless data connection, are taken into consideration. Such additional data may for example be traffic data transmitted by a vehicle-external apparatus, for example a traffic management system, and/or movement data transmitted via a car-2-car data connection by the other vehicle detected as the obstacle, which movement data indicate a planned movement or reaction of the other vehicle.

In other words, it is therefore possible to determine whether the sufficient reduction of the transverse overlap can be achieved in the best case scenario or realistically, i.e., for example with at least a predefined minimum probability. However, if it is determined that, even in the best case scenario or with a correspondingly high probability, the transverse overlap, i.e., an overlap between the motor vehicle and the other vehicle in the relevant vehicle transverse direction, cannot be completely eliminated, the driver assistance system can prevent a collision with a merely reduced transverse overlap, i.e., with a transverse offset that is not sufficient for preventing a collision. The transverse overlap may for example be 70% at the time at which the determined probability of collision reaches or exceeds the predefined first threshold value. If it is then determined, in consideration of the physical circumstances or conditions in the relevant situation, that the transverse overlap can only be reduced to 15% for example, corresponding measures, control commands or control actions that would achieve this, or the execution thereof, can be prevented or inhibited. In such a case, the collision can no longer be prevented, however a collision with a greater transverse overlap may have less severe and more predictable effects or consequences for the driver and any other occupants of the motor vehicle and of the other vehicle. For example, a resulting rotation of the motor vehicle about a point of collision or impact can be prevented or reduced compared with a collision with a smaller transverse overlap. As a result, the motor vehicle may be prevented from being hurled into oncoming traffic or down a slope located next to the road, for example. In addition, in the case of greater transverse overlap, more impact energy can be absorbed by components of the motor vehicle and of the other vehicle provided for this purpose, i.e., a relevant crumple zone. As a result, the probability of the passenger compartment of the motor vehicle and of the other vehicle both remaining intact is increased, as a result of which the probability of serious injuries to the relevant driver can be significantly reduced.

In other embodiments, the driver assistance system is configured to optimize the probability of successful evasion and to optimize the driving stability of the motor vehicle during evasion and, for this purpose, to determine, depending on properties relating to the driving mechanics properties of the motor vehicle, the density of traffic in the environment, a relative speed between the motor vehicle and the obstacle and the relevant local road conditions, whether an automatic braking action should be carried out and, if applicable, whether the automatic braking action should be carried out before, during and/or after a steering action carried out in order to guide the motor vehicle along the evasion trajectory. The properties relating to the driving mechanics of the motor vehicle, which for example indicate or determine a driving behavior or possible change in the movement or driving state of the vehicle, may for example be stored predefined in a memory apparatus of the driver assistance system. In this case, various scenarios or courses of action can therefore be analyzed or simulated and compared with one another in order to determine which scenario or course of action is most likely to enable successful and controlled evasion. A classification, for example a table or characteristic map or the like, may for example also be predefined, as a result of which it can be specified or predefined which scenario or course of action should be implemented or pursued under which conditions.

A typical situation, in which, for example, merely a steering action without an automatic braking action should be carried out, may for example be a journey in an urban area at a relative speed between the motor vehicle and the other vehicle of approximately 28 m/s, i.e., approximately 100 km/h. In this situation, the motor vehicle or the other vehicle may for example travel over a central line separating respective traffic lanes, for example on account of inattentiveness of the driver or dazzling of the driver by light or the like. A risk of a collision having a probability of collision over the first threshold value is then identified, for example using parameters such as the relative speed, lateral velocity vectors, yaw rates, a predicted transverse overlap between the motor vehicle and the other vehicle, and/or the like. If it is then determined that the collision can no longer be prevented without intervention of the driver assistance system and/or that the motor vehicle will likely get out of control, the driver assistance system performs a corresponding action, for example modifying the control action of the driver and/or an additional or alternative automated control action, in order to guide the motor vehicle along the pre-planned evasion trajectory or to assist the driver therewith. In the process, parameters such as a desired, i.e., predefined, lateral and/or longitudinal safety distance, a required control or response time, pressure build-up and/or latency times and/or the like can for example be taken into consideration. Therefore, if the driver steers too weakly, for example, this can be corrected in order to reduce or eliminate the transverse overlap sufficiently quickly, i.e., to produce the transverse offset required for preventing a collision. Conversely, oversteering, i.e., if the motor vehicle is steered too strongly, and thus destabilization of the motor vehicle can be prevented or corrected.

The evasion trajectory or plurality of alternative evasion trajectories are in particular planned when the presence of relevant oncoming objects or obstacles that could pose a risk of collision is initially identified. In the process, at least one relevance criterion can be predefined and evaluated or checked, for example if a predefined minimum longitudinal distance or the like is not maintained. Therefore, at least one valid trajectory or evasion trajectory along which the motor vehicle can be guided so as to prevent a collision, if the collision is in fact preventable, is available in a timely manner.

A typical situation in which a combined steering and braking action should be carried out may arise when driving outside of urban areas, for example during travel on a rural road with typical relative speeds between the motor vehicle and the other oncoming vehicle of approximately 56 m/s, corresponding to approximately 200 km/h. In this case, at a time when the other vehicle is identified or determined as an obstacle posing a potential risk of collision, a pre-stored automated braking action may be carried out with the benefit that kinetic energy can be dissipated at a particularly early stage and thus, at the same time, a minimum evasion distance required for an evasion maneuver, i.e., a longitudinal distance between the motor vehicle and the other vehicle in the direction of travel of the motor vehicle, is reduced. As a result, there is beneficially also more time for determining the evasion trajectory. For this purpose, deceleration and lateral vectors, for example, are planned and optimized depending on parameters such as the current speed, the actual and/or predicted transverse overlap, an achievable transverse acceleration, the longitudinal distance and/or the like. A two-stage system triggering is therefore provided in this case, the automatic pre-stored braking action or braking procedure together with a relatively brief, relatively high deceleration taking place as the first stage and, temporally subsequent hereto or afterward, the evasion procedure or evasion maneuver taking place or being carried out as the second stage, the motor vehicle therefore being guided along the evasion trajectory past the other vehicle. In the case of the combined steering-braking procedure, the automatic braking action and the steering action can take place at least in part at the same time, i.e., such that they temporally overlap one another, or they may be carried out one immediately after the other.

In a third situation, it may be determined, for example, that at most a partial reduction of the transverse overlap can be achieved, it not being possible to reliably predict resulting collision or accident consequences. In such a situation, in which complete evasion therefore is not or cannot be ensured, an automatic braking action, in particular emergency braking, can be carried out and the steering action can be omitted or a steering action can be prevented.

For the above-mentioned classification, speed threshold values for the relative speed between the motor vehicle and the obstacle may for example be predefined in order to allow for selection of a relevant scenario or procedure particularly quickly and clearly. The speed threshold values can be adapted in a dynamic manner, for example depending on the above-mentioned parameters and/or depending on environmental data or data on the surroundings, for example the slipperiness of the road surface being traveled on and/or the presence of uneven ground, for example a curb or the like. For example, traveling onto a curb during the evasion maneuver may or may not lead to a loss of control, i.e., to destabilization of the motor vehicle, depending on the speed of the motor vehicle. Said parameters or circumstances can also be considered for determining or planning the evasion trajectory and/or for optimizing the probability of successful evasion and driving stability. Other parameters or circumstances may also be considered here, such as the activity or behavior of the driver, which will be explained in greater detail below.

In other embodiments, the driver assistance system is configured to assist with guidance of the motor vehicle along the evasion trajectory by automatically adjusting the distribution of torque (active yaw control, torque vectoring) and/or by controlling an active chassis of the motor vehicle in order to adjust an individual wheel load. On account of these measures, the guidance of the motor vehicle along the evasion trajectory can be assisted or ensured effectively and, at the same time, in a particularly transparent manner to the driver, i.e., so as to remain unnoticed by the driver. The driver thus maintains basic control over the motor vehicle and for example determines a direction of a steering turn themselves. The distribution of torque and individual wheel load are variables or parameters that cannot typically be controlled directly by the driver, and therefore, by means of the automatic or automated adjustment thereof, an additional safety gain can be achieved in a particularly effective and efficient manner, in particular without depriving the driver of the control over the vehicle that they are accustomed to. The latter may contribute to a greater acceptance and thus spread of the driver assistance system according to the present aspect.

In other embodiments, the driver assistance system is configured to trigger a warning cascade in the event a risk of collision is identified. The warning cascade may consist of, in the following sequential order, an optical warning signal, an acoustic warning signal, a haptic warning signal and finally modification of the control action of the driver and/or a control action of the driver assistance system. The warning cascade may be triggered as early as when the risk of collision or probability of collision reaches or exceeds a predefined second threshold value that is lower than the predefined first threshold value. In other words, the warning cascade may for example be triggered as early as before the prevention of the collision is unpreventable without a control action of the driver assistance system. Because the warning signals or warnings are firstly issued to the driver, the driver may be made aware of the risk of collision at a particularly early stage and be more likely to guide the motor vehicle past the relevant obstacle in a safe and controlled manner. In particular, distraction or startling of the driver can thus be prevented or reduced by means of an automatic control action. As a result, startle responses of the driver that could influence the movement or driving state of the vehicle in an uncontrolled and undesired manner and thus make successful evasion more difficult can be prevented. In some embodiments, the warning cascade can be terminated as soon as the driver reacts to one of the warning signals with a control action and it is determined that the motor vehicle is being guided past the obstacle by means of this control action, in particular if it is determined that the probability of collision is lowered by means of the control action. In particular, the warning cascade may be terminated, i.e., an automatic control action or modification of the control action of the driver can be omitted, if the probability of collision has not reached or falls below the predefined first threshold value or below the second threshold value on account of the control action of the driver before an automatic control action carried out by the driver assistance system is required in order to prevent a collision. As a result, control over the motor vehicle can as far as possible be left to the driver, as a result of which said driver is not only less distracted or irritated, but also the acceptance and thus the spread of the driver assistance system can be improved further.

In other embodiments, the driver assistance system is configured to monitor whether the driver carries out the control action and, if this is not the case in the event a risk of collision has been identified, to guide the motor vehicle in an automated manner along the evasion trajectory by means of an automatic control action. In these embodiments, the driver assistance system is thus configured for autonomous or automated guidance or operation of the motor vehicle, at least for or within the context of preventing collisions. On account of the reaction of the driver assistance system, which is adapted or graded depending on the reaction or behavior of the driver, collisions may be reliably prevented in a particularly large number of situations, the control over the motor vehicle beneficially being left as far as possible to the driver at the same time. For example, the risk of collision can arise if or because the driver has fallen asleep or can no longer manually control the motor vehicle on account of a medical emergency, for example. In such a case, it may not be possible for the driver to manually carry out the or a control action in order to prevent the collision. Accordingly, a modification of a control action by means of the assistance system may not be possible. This problem is circumvented here by virtue of the driver-independent, automatic control action.

In further embodiments, the driver assistance system comprises a driver monitoring apparatus. This may for example be or comprise a camera arranged inside the motor vehicle and directed toward to the driver or a driver's seat of the motor vehicle. Equally, the driver monitoring apparatus may additionally or alternatively comprise a sensor system, which detects operational inputs or actions of the driver. In the present embodiments, the driver assistance system is configured to carry out the automatic control action if a reaction time window after identification of the risk of collision has elapsed without the driver having started the control action themselves in order to prevent a collision. Further, the driver assistance system is configured to automatically adapt a temporal length of the reaction time window depending on driver reaction data provided by the driver monitoring apparatus and characterizing a behavior and/or driving style of the driver. In other words, it is possible to wait for a reaction time of the driver before the automatic control action is carried out. As a result, the driver is given the opportunity to react to the risk of collision or to the obstacle and to steer the motor vehicle past the obstacle themselves.

However, the actual required reaction time may vary between different drivers or for the driver in different situations. For example, if it is known that the driver usually has a relatively short reaction time and in the past, by means of their driving style, has demonstrated above-average skill in guiding the motor vehicle, the length of the reaction time window can be increased and the automatic control action can thus be carried out at a later point in time, since there is a higher probability of the driver being able to guide the motor vehicle past the obstacle safely and reliably even in the event of relatively late manual intervention. However, if for example it is determined that the driver can no longer react in a timely, safe and targeted manner in their current state and/or based on their skill in guiding the motor vehicle demonstrated in the past by means of their driving style or behavior, the automatic control action can be moved forward and the length of the reaction time window can thus be reduced. Because the automatic control action can then take place earlier, it can be less strong, as a result of which the probability of destabilization of the motor vehicle, i.e., the probability of the motor vehicle getting out of control, can be reduced and/or the probability of the collision being prevented can be improved. It is therefore not necessary to wait for a latest possible point in time for preventing the collision before the automatic control action is carried out. In summary, a particularly flexible reaction of the driver assistance system adapted to the situation is made possible, as a result of which the driver assistance system and the behavior thereof can be optimally tailored to the individual driver, their characteristics and/or state in order to be able to reach an optimal compromise between takeover of control, i.e., depriving the driver of control, of the motor vehicle on the one hand and a level of comfort determined by the strength of the automatic control action on the other.

An additional aspect concerns a motor vehicle that comprises environment sensors for detecting environmental data, which characterize a current environment of the motor vehicle, and a driver assistance system according to the preceding embodiments, connected to said sensors. The motor vehicle may therefore in particular be the motor vehicle mentioned in connection with the driver assistance system of the first aspect. Accordingly, the motor vehicle may comprise some or all of the properties and components mentioned in connection with the driver assistance system, discussed in the preceding. This may for example relate to apparatuses such as the power steering or the braking system as well as to the operating elements and sensors and/or the like mentioned.

Another aspect is a method for operating a motor vehicle. In the method, at least one obstacle is automatically detected and a risk of collision for a collision of the motor vehicle with the obstacle is automatically determined by means of the driver assistance system based on the environmental data. Further, at least one evasion trajectory for preventing the collision is automatically determined for the motor vehicle by means of the driver assistance system. According to the present aspect, in the method, the driver assistance system detects another vehicle which is approaching the motor vehicle and for which the risk of collision is greater than a predefined first threshold value as the obstacle. Further, according to the present aspect, in the method, the driver assistance system checks whether a control action of the driver of the motor vehicle is guiding or will likely guide the motor vehicle along the determined evasion trajectory and, if this is not the case, modifies the control action of the driver automatically such that the motor vehicle is guided along the determined evasion trajectory by means of the modified control action. In other words, the driver assistance system according to the first aspect and the motor vehicle according to the preceding aspect are configured to carry out or perform the method according to the present aspect. Procedures, measures or courses of action described in connection with the driver assistance system according to the first aspect and/or in connection with the motor vehicle according to the preceding aspect may be provided as further, potentially optional, method steps of the method according to the present aspect.

In order to be able to carry out or perform the method according to the present aspect, i.e., the described measures, procedures or courses of action, the driver assistance system according to the first aspect and the motor vehicle according to the preceding aspect may each comprise a corresponding data processing apparatus. Said data processing apparatus may for example comprise a computer-readable storage medium on which a program code or computer program or computer program product that represents or encodes the method steps of the method is stored. Further, the data processing apparatus may comprise a processor apparatus, for example a microprocessor or a microcontroller, that is connected to the computer-readable storage medium. The processor apparatus is designed and arranged to execute the program code or computer program stored on the computer-readable storage medium, as a result of which the method steps of the corresponding method are prompted or prompted to be carried out in an at least partially automatic manner. When executed by the processor apparatus, the computer program or program code is designed to prompt the method according to the present aspect to be carried out, i.e., to cause the driver assistance system or motor vehicle to perform the method. The storage medium may be non-transitory in some embodiments.

The above-mentioned computer program product and the above-mentioned computer-readable storage medium each form another aspect.

Also belonging to the present discussion are embodiments of the motor vehicle according to the preceding aspect and of the method according to the present aspect that have features which have already been described in conjunction with the embodiments of the driver assistance system according to the first aspect and vice versa. In order to avoid unnecessary redundancy, the corresponding developments will not be described separately again for all of these aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

The exemplary embodiment explained in the following is a specific non-limiting embodiment. In the exemplary embodiment, the described components of the embodiment each represent individual features that should be considered independent of each other, and each also develop the respective subject matter independently from each other and should therefore be considered as a part of the present discussion both individually or in another combination other than that portrayed. In addition, the described embodiment can also be supplemented by other features of the present discussion than those already described.

FIG. 1 is a schematic plan view of a traffic scene with a road 1, which has two lanes that are denoted here as the right-hand line 2 and the left-hand lane 3. In the present case, a motor vehicle 4 is traveling on the right-hand lane 2. Another vehicle 5 is shown approaching the motor vehicle 4, which other vehicle has partially left the left-hand lane 3 and is moving toward the right-hand lane 2 and the motor vehicle 4 in the present case. Directions of travel of the motor vehicle 4 and the other vehicle 5 are indicated here by means of corresponding arrows.

Figure 2:
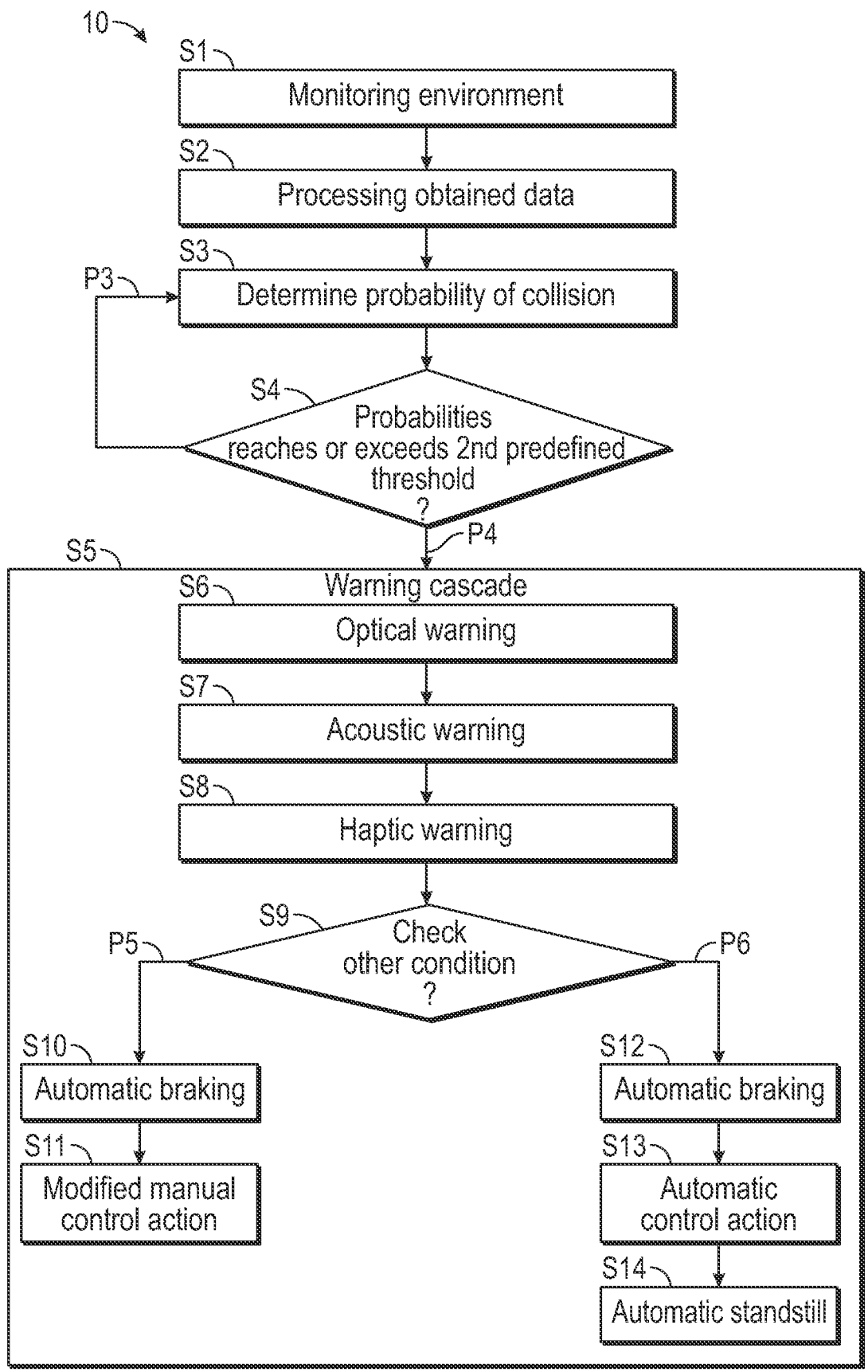
FIG. 2 is an exemplary schematic flow chart for a method for operating the motor vehicle from FIG. 1 or the driver assistance system thereof.

The motor vehicle 4, which is being controlled by a driver 6, comprises a driver assistance system 7 which is designed and configured to prevent collisions, i.e., to prevent collisions of the motor vehicle 4 and/or to assist the driver 6 in guiding the motor vehicle 4 so as to prevent collisions. For this purpose, the driver assistance system 7 comprises a computer-readable storage medium 8 having a computer program, for example an operating program for the driver assistance system 7, as well as a processor apparatus 9 connected to said storage medium for executing said computer program. FIG. 2 shows a schematic overview of functions or program modules or units of said computer program as an exemplary schematic flow chart 10, which will be explained in greater detail below. In order to fulfill its task, the driver assistance system 7 processes data that it receives via an on-board network 11 of the motor vehicle. In the present case, by way of example, environment sensors 12 for detecting an environment or corresponding environmental data characterizing the environment of the motor vehicle 4 are connected to said on-board network 11. Said environment in the present case comprises, for example, the portion of the road 1 shown here, including a course of the lanes 2, 3 and the other vehicle 5 as well as a side region, which extends next to the road 1, in particular next to the right-hand lane 2.

A control apparatus 13 for controlling or regulating a drive system 14 of the motor vehicle 4 is further connected to the on-board network 11. The control apparatus 13 and the drive system 14 may be understood here as representative of a plurality of apparatuses or functional units. The drive system 14 may therefore, for example, comprise or represent a drive engine, transmission, steering apparatus, active chassis, shock-absorption apparatus, braking system, corresponding connections and actuators and the like. Accordingly, the control apparatus 13 may comprise or represent corresponding control units, sensors, actuators and/or the like. The control apparatus 13 may for example transmit corresponding operating or driving state data, characterizing a current situation of the motor vehicle 4, to the driver assistance system 7. Further, a camera 15 directed toward the driver 6 is connected to the on-board network 11 as the driver monitoring apparatus. The camera 15 may transmit image data of the driver 6 to the driver assistance system 7, from which data the driver assistance system 7 can determine a reaction or a behavior of the driver 6 by means of image processing.

A collision between the motor vehicle 4 and the other vehicle 5 may follow on from the situation shown in FIG. 1 if both vehicles continue to move on their current course without any change. Such a collision would in this case correspond to a frontal collision between the motor vehicle 4 and the other vehicle 5 approaching said motor vehicle. Frontal collisions of this kind may have particularly serious consequences, since a relative speed between the motor vehicle 4 and the other vehicle 5 is especially high, for example in contrast to a typical rear-end collision between two vehicles traveling in the same direction. An aim in the present case is therefore to prevent such frontal collisions or to reduce the severity of the collision or accident in the event of frontal collisions with oncoming objects by means of an evasion procedure and/or braking.

For this purpose, the driver assistance system 7 is provided in the present case. The driver assistance system 7 is thus a system or represents a function or functionality by means of which frontal collisions, i.e., head-on collisions, typically between two motor vehicles, can be prevented or attenuated by means of an active steering and/or braking procedure. In principle, it is possible to apply the teachings, presented herein, in both single-track vehicles and multi-track vehicles.

In a method step S1, the motor vehicle 4 and the driver assistance system 7 are for example put into operation. Subsequently, during operation of the motor vehicle 4 and the driver assistance system 7, the environment and the driver 6 are detected or monitored continuously by means of the environment sensors 12 and the camera 15, and a course, i.e., a trajectory or movement, of the motor vehicle 4 is predicted for a prediction time period that extends from the current point in time into the future. The continuous implementation of these measures or procedures is indicated here by means of a loop-shaped program path P1. In the present case, the environment sensors 12 detect the other vehicle 5 in particular.

In a method step S2, the data recorded in the method step S1 are processed by the driver assistance system 7. In the present case, the other vehicle 5 is identified and classified as the obstacle approaching the motor vehicle 4. A course or trajectory of the other vehicle may in particular be determined and taken into consideration in the process. The driver assistance system 7 is therefore beneficially not reliant on road or lane markings in order to detect or identify the other vehicle 5 as an obstacle posing a risk of collision. This also means, for example, that it is irrelevant which road user is responsible for the risk of collision or the potentially imminent frontal collision in each case.

Obstacles can also be detected and tracked and the course or trajectory thereof, in particular relative to the motor vehicle 4, can also be predicted continuously or repeatedly during operation of the motor vehicle 4 and driver assistance system 7, which is indicated here by means of a loop-shaped program path P2.

As soon as an obstacle, in the present case the other vehicle 5, has been detected in the environment of the motor vehicle 4, in a method step S3, a probability of collision, i.e., a probability of a collision between the motor vehicle 4 and the relevant obstacle, can be determined by means of the driver assistance system 7. Equally, one or more evasion trajectories that the motor vehicle 4 could follow in order to prevent the collision with the relevant obstacle can be determined for each of the obstacles or, for example, for each of the detected obstacles for which a probability of collision above a probability threshold value has been determined. The possible trajectories can be determined or calculated in real time by means of existing hardware, for example a suitable dedicated microprocessor, the data interfaces of which are sensorically and actuatorically embedded in a corresponding architecture, for example the driver assistance system 7, the on-board network 11 and/or the control apparatus 13. Solutions are already known for calculating or planning trajectories for motor vehicles.

In a method step S4, it is continuously checked whether one of the determined probabilities of collision reaches or exceeds a second predefined threshold value. This continuous determination and checking of the probabilities of collision is indicated here by means of a loop-shaped program path P3.

As soon as a collision is categorized as more than probable, i.e., the second threshold value has been reached or exceeded, for example in consideration of parameters such as the relative speed, a lateral offset, a yaw rate, an object distance in the longitudinal direction between the motor vehicle 4 and the relevant obstacle and/or the like, the method follows a program path P4 and a warning cascade is triggered in a method step S5. The warning cascade represents a multi-stage triggering or multi-stage intervention of the driver assistance system 7, with the aim of preventing or attenuating the collision.

In the present case, in a method step S5, an optical warning is provided to the driver 6 as part of the warning cascade. If the driver 6 does not react to said warning or if they do not react effectively enough hereto in order to be likely to prevent the collision, in a method step S7, an acoustic warning is issued to the driver 6 in order to alert them or make them aware of the fact that there is still the risk of a collision. If, in this case too, the driver 6 does not react or does not react sufficiently, in a method step S8, a haptic warning is generated, i.e., issued to the driver 6. Said haptic warning may for example be or comprise a vibration of a steering wheel and/or a pedal of the motor vehicle or the like.

In a method step S9, at least one other condition may be checked. For example, it may be checked whether the probability of collision has reached or exceeded a predefined threshold first value, which is higher than said second threshold value, and thus in particular whether it has to be assumed that the collision is unpreventable if no control action takes place in order to change the movement or trajectory of the motor vehicle 4. Equally, it may for example be checked whether a predefined reaction time window has elapsed, for example since the optical, acoustic and/or haptic warning. Equally, it may be checked how much time remains until a critical point in time at which the control action must take place at the latest in order to prevent the collision. Said remaining time or period of time may be compared with a reaction time determined for the driver 6 or a predefined reaction time. Said reaction time and the reaction time window may be dynamically adapted, for example based on a tracked history of a driving behavior or driving style and/or based on a current state of the driver 6, by means of the driver assistance system during operation thereof. The state of the driver 6 may for example be determined by means of the driver assistance system 7 based on the image data supplied by the camera 15. For example, a level of wakefulness or alertness of the driver may be concluded from an eye or eyelid movement.

A scenario or course of action for a control action of the driver assistance system 7 may be determined or selected depending on the circumstances of the relevant situation, for example the speed of the motor vehicle 4, the relative speed between the motor vehicle 4 and the other vehicle 5, a known local friction coefficient of the road 1 or a local friction coefficient thereof assumed for example based on a detected weather condition, and/or other parameters.

If the driver 6 reacts in a timely manner, i.e., in particular before the above-mentioned critical point in time, the method can follow a program path P5. Depending on the determined or selected scenario or course of action, in a method step S10, an automatic braking action may be prompted by the driver assistance system 7. For this purpose, a corresponding control command may for example be transmitted from the driver assistance system 7 via the on-board network 11 to the control apparatus 13, which then executes the command, for example correspondingly actuates a braking system of the motor vehicle 4.

The control action or system intervention by the driver assistance system 7 is possible in different versions depending on the speed, for example. In a first version, the relative speed between the motor vehicle 4 and the other vehicle 5 is relatively low, for example lower than a first predefined speed threshold value. As a general rule, it should in this case be assumed that an initially inattentive but skilled driver 6 with fast reactions would be able to perform an evasion procedure themselves after the warning or warnings issued by the driver assistance system 7, by means of which evasion procedure the collision is prevented. For example, depending on the type of evasion procedure carried out by the driver 6, for example a direction of a steering wheel turn, depending on a spatial and kinetic or dynamic development of the relevant situation and/or other parameters, the driver assistance system can determine one of the evasion trajectories that was determined, for example, in the method step S3 and that since then has been continuously updated as the evasion trajectory to actually follow. FIG. 1 schematically indicates a first evasion trajectory 16, a second evasion trajectory 17 and a third evasion trajectory 18. All of these evasion trajectories 16, 17, 18 will likely ensure a sufficient transverse offset between the motor vehicle 4 and the other vehicle 5 in order to prevent the collision, will guide the motor vehicle 4 past the other vehicle 5 and then back onto the right-hand lane 2. If the driver 6 steers to the right, for example, one of the evasion trajectories 16, 17 may be selected such that it is not necessary to completely reverse the steering turn of the driver, which could lead to confusion and unpredictable reactions. Whether the first evasion trajectory 16 or the second evasion trajectory 17 is selected may for example depend on local conditions next to the right-hand lane 2, a maximum achievable transverse acceleration or change of direction and/or the like.

The evasion procedure, i.e., an evasion maneuver due to the oncoming other vehicle 5, can be a stressful situation for the driver 6, in which experience has shown that they cannot always react calmly, precisely and in a target-oriented manner. In order to optimize the actual movement of the motor vehicle 4 with regard to collision prevention and driving stability, in a method step S11, the manual control action of the driver 6 is modified by the driver assistance system 7 in order to guide the motor vehicle 4 along the selected evasion trajectory 16, 17, 18. For this purpose, corresponding modifications or control commands can be sent by the driver assistance system 7 to the control apparatus 13 via the on-board network 11. In order, for example, to produce the necessary lateral offset to prevent a collision and at the same time prevent overcontrol of the motor vehicle 4, the evasion procedure carried out by the driver 6 can be facilitated by the driver assistance system 7, for example by applying an additional steering torque or counter-steering torque, by increasing or decreasing a steering angle, by means of single-wheel braking, by means of rear-axle steering, by means of torque vectoring, by adjusting an active chassis, by adjusting a wheel load and/or the like. The evasion procedure or control action of the driver 6 is thus optimized by means of the driver assistance system 7.

The transverse or lateral offset between the motor vehicle 4 and the other vehicle 5 required for preventing a collision may for example be produced by means of a steering action and facilitated for example by means of wheel-selective braking. Since the wheel-selective braking cannot be influenced directly by the driver 6, in the case in which the driver 6 does not follow the predefined or selected evasion trajectory 16, 17, 18 or oversteers, i.e., overcontrols the modification or assistance provided by the driver assistance system 7, it is possible for said wheel-selective braking to be deactivated. The same may apply to assistance for example in the form of rear-axle steering, torque vectoring, wheel-load alteration by means of the active chassis and the like.

As a result, not only can on the one hand a desire of the driver 6 made clear by means of the manual control action be satisfied or complied with, the motor vehicle 4 can on the other hand also be guided safely, reliably and stably along the relevant, collision-free evasion trajectory 16, 17, 18 identified as ideal or optimal according to the situation. Beneficially, it is possible for the driver 6 to leave the selected evasion trajectory 16, 17, 18, for example by applying a sufficiently high steering torque. As a result, it is possible to provide for situations in which the driver 6 may perhaps have more information or other information than the driver assistance system 7.

Depending on the determined or selected scenario or course of action, one or more automatic braking actions may be carried out by the driver assistance system 7 before, during and/or after the control action or actions performed by the driver 6. The evasion procedure or control action of the driver 6 can thus be supplemented by a braking procedure, for example if the evasion procedure, i.e., a steering action alone, cannot prevent the collision. There are various combination options that can be selected depending on the situation. A first combination of this kind, i.e., a first scenario or first course of action, may for example comprise relatively brief and strong braking, followed by release of the brakes, followed by the steering action for the evasion. A second combination may for example comprise relatively brief and strong braking, followed by release of the brakes, followed by a steering action for the evasion, followed by another instance of braking. Other combinations may for example be or comprise braking and subsequent or temporally overlapping evasion or evasion followed by braking.

The evasion procedure may for example comprise steering away from the collision object, stabilization of the motor vehicle 4 and ensuring continued travel in parallel or collinear with the original trajectory of the motor vehicle 4, if applicable with zero offset in the transverse direction.

If the driver 6 exhibits no reaction, i.e., carries out no control action in order to prevent a collision, the method can instead follow a program path P6. In this case, too, automatic braking can be carried out first of all in a situation-dependent, i.e., potentially optional, method step S12. As in the method step S10, here in S12, the collision prevention can be facilitated or optimized depending on the situation by means of an additive braking action of the driver assistance system 7 before, during and/or after the evasion or steering action. There are numerous conceivable scenarios for this and they depend for example on properties of the motor vehicle 4, such as mass, center of gravity, wheel base and the like, the density of traffic, local conditions, such as lane width, road conditions, the friction coefficient and the like, situational particularities, such as speeds, overlap and the like. Examples of relevant reaction options include simple evasion, braking with subsequent evasion, braking with simultaneous evasion, braking followed by evasion followed by braking, evasion with subsequent braking. A decision as to the best way to prevent a collision in a given case, i.e., one which is safe from a driving dynamics perspective and which is safe to use or implement in a given environment, can automatically be made by means of the driver assistance system 7 based on the above-mentioned parameters and/or other parameters.

In a subsequent or temporally overlapping method step S13, the driver assistance system 7 may then carry out an automatic control action in order to guide the motor vehicle 4 autonomously along the selected evasion trajectory 16, 17, 18. Such automatic evasion may for example be carried out if the driver 6 does not perform any collision-preventing actions, i.e., does not brake and/or steer, within an applicable collision time gap. As described above, the camera 15 and/or an estimation of the activity or behavior of the driver 6, for example based on the characteristic driving style of said driver, can be provided in order to quantify the collision time gap. As described above, the automatic evasion procedure can also be combined with one or more braking procedures.

The automatic or autonomous control action by the driver assistance system 7 may constitute a second version of the system intervention by the driver assistance system 7. For example, in cases of higher relative speeds between the vehicles involved, it may in particular be assumed that an initially inattentive driver will no longer be able to intervene in a timely manner so as to prevent a collision. A system response time, i.e., a time window for the introduction of a reaction, i.e., of the control action, may for example be less than 1 second in the case of typical rural road or highway speeds. The warnings issued as required to the driver 6 in the method steps S6 to S8 may in this case be given immediately before the automatic control action by means of the driver assistance system 7 and thus primarily serve to alert the driver 6 in order to make them aware that an automatic system intervention or control action will take place. The evasion procedure then takes place automatically, i.e., the driver 6 does not necessarily have to actively perform a control action, for example a steering movement. In principle, the hands of the driver 6 in this case do not have to be on the steering wheel of the motor vehicle 4, for example. The driver assistance system 7 proposed herein is therefore also suitable for pilot operation of the motor vehicle 4.

In particular for the case in which the driver 6 has exhibited no reaction before or during the evasion procedure, in a method step S14, after the motor vehicle 4 has passed the other vehicle 5, the motor vehicle 4 can automatically be brought to a standstill. In such a case, it should be assumed that there are special circumstances which could undermine regular continuation of the current journey of the motor vehicle 4.

The steps and courses of action of the method described herein may, if required, also be performed in different orders or at least partially at the same time, for example.

In summary, the examples described show how road traffic safety can be increased by means of the driver assistance system 7 for actively preventing frontal collisions by assisting the driver 6 during guidance of the motor vehicle 4, i.e., by means of a system for preventing head-on collisions.

REFERENCE NUMBER LIST

1 Road
2 Right-hand lane
3 Left-hand lane
4 Motor vehicle
5 Other vehicle
6 Driver
7 Driver assistance system
8 Storage medium 9 Processor apparatus
10 Flow chart
11 On-board network
12 Environment sensors
13 Control apparatus
14 Drive system
15 Camera
16 First evasion trajectory
17 Second evasion trajectory
18 Third evasion trajectory
S1-S13 Method steps
P1-P5 Program paths The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. An on-board driver assistance system for a motor vehicle for preventing collisions, comprising a data processing apparatus having a data interface for receiving driving state data of the motor vehicle and environmental data provided by environment sensors on board the motor vehicle, the on-board driver assistance system being configured to:
   detect at least one obstacle based on the environmental data and to determine a risk of frontal collision depending on one or more of the driving state data and the environmental data;
   determine an evasion trajectory for preventing or mitigating a frontal collision of the motor vehicle with the obstacle;
   detect if the obstacle is another vehicle, which vehicle is approaching the motor vehicle;
   determine, whether the risk of frontal collision is greater than a predefined first threshold value;
   if the obstacle is another vehicle and the risk of frontal collision is greater than the predefined first threshold value, determine whether a control action of a driver of the motor vehicle is guiding the vehicle along the determined evasion trajectory; and
   if this is not the case, to modify the control action of the driver automatically such that the motor vehicle is guided along the determined evasion trajectory by the modified control action; wherein
   the on-board driver assistance system is configured to optimize a probability of successful evasion and to optimize the driving stability of the motor vehicle during evasion; and to determine, depending on one or more of properties of the driving mechanics of the motor vehicle, a density of traffic in an environment of the motor vehicle, a relative speed between the motor vehicle and the obstacle, and road conditions, whether an automatic braking action should be carried out and whether the automatic braking action should be carried out before, during and/or after a steering action is carried out in order to guide the motor vehicle along the evasion trajectory.

2. The driver assistance system of claim 1, wherein the driver assistance system is configured to detect a plurality of obstacles in the environment, to track the movement of said obstacles relative to the motor vehicle and, for those of the obstacles for which a probability of collision other than zero has been determined, to also determine and continuously update the evasion trajectory if the probability of collision is less than the predefined first threshold value.

3. The driver assistance system of claim 2, wherein the driver assistance system is configured to automatically determine whether a reduction of a transverse overlap between the motor vehicle and obstacle that is sufficient for preventing a collision or reducing the impact of the collision can be achieved by a control action and, if this is not the case, to inhibit control actions, which would lead to an insufficient reduction of the transverse overlap.

4. The driver assistance system of claim 2, wherein the driver assistance system is configured to assist with guidance of the motor vehicle along the evasion trajectory by one or more of automatic torque vectoring and controlling an active chassis of the motor vehicle in order to adjust an individual wheel load.

5. The driver assistance system of claim 2, wherein the driver assistance system is configured to trigger a warning cascade in the event a risk of frontal collision is identified, the warning cascade comprising, in the following sequential order, an optical warning signal, an acoustic signal, a haptic warning signal and a control action and/or modification of the control action of the driver.

6. The driver assistance system of claim 1, wherein the driver assistance system is configured to automatically determine whether a reduction of a transverse overlap between the motor vehicle and the obstacle that is sufficient for preventing a collision or reducing the impact of the collision on the driver can be achieved by a control action and, if this is not the case, to inhibit control actions, which would lead to an insufficient reduction of the transverse overlap.

7. The driver assistance system of claim 6, wherein the driver assistance system is configured to assist with guidance of the motor vehicle along the evasion trajectory by one or more of automatic torque vectoring and controlling an active chassis of the motor vehicle in order to adjust an individual wheel load.

8. The driver assistance system of claim 6, wherein the driver assistance system is configured to trigger a warning cascade in the event a risk of frontal collision is identified, the warning cascade comprising, in the following sequential order, an optical warning signal, an acoustic signal, a haptic warning signal and a control action and/or modification of the control action of the driver.

9. The driver assistance system of claim 1, wherein the driver assistance system is configured to assist with guidance of the motor vehicle along the evasion trajectory by one or more of automatic torque vectoring and controlling an active chassis of the motor vehicle in order to adjust an individual wheel load.

10. The driver assistance system of claim 9, wherein the driver assistance system is configured to trigger a warning cascade in the event a risk of frontal collision is identified, the warning cascade comprising, in the following sequential order, an optical warning signal, an acoustic signal, a haptic warning signal and a control action and/or modification of the control action of the driver.

11. The driver assistance system of claim 1, wherein the driver assistance system is configured to trigger a warning cascade in the event that the risk of frontal collision is determined, the warning cascade comprising, in the following sequential order, an optical warning signal, an acoustic signal, a haptic warning signal and a control action and/or modification of the control action of the driver.

12. The driver assistance system of claim 1, wherein the driver assistance system is configured to:
monitor whether the driver carries out the control action; and
if the driver does not carry out the control action and the risk of frontal collision has been identified, to guide the motor vehicle in an automated manner along the evasion trajectory by an automatic control action.

13. The driver assistance system of claim 12, wherein the driver assistance system comprises a driver monitoring apparatus and is configured
to carry out the automatic control action if a reaction time window after determination of the risk of frontal collision has elapsed without the driver having started the control action themselves in order to prevent a collision; and
to automatically adapt a temporal length of the reaction time window depending on driver reaction data provided by the driver monitoring apparatus and characterizing a behavior and/or driving style of the driver.

14. A motor vehicle, comprising environment sensors for detecting environmental data that characterize a current environment of the motor vehicle, and an on-board driver assistance system, the driver assistance system being configured to:
detect at least one obstacle based on the environmental data and to determine a risk of frontal collision depending on one or more of the driving state data and the environmental data; and
determine an evasion trajectory for preventing or mitigating a frontal collision of the motor vehicle with the obstacle;
detect if the obstacle is another vehicle, which vehicle is approaching the motor vehicle;
determine, whether the risk of frontal collision is greater than a predefined first threshold value;
if the obstacle is another vehicle and the risk of frontal collision is greater than the predefined first threshold value, determine whether a control action of a driver of the motor vehicle is guiding the vehicle along the determined evasion trajectory; and
if this is not the case, to modify the control action of the driver automatically such that the motor vehicle is guided along the determined evasion trajectory by the modified control action; wherein
the driver assistance system is configured to optimize a probability of successful evasion and to optimize the driving stability of the motor vehicle during evasion and, for this purpose, to determine, depending on one or more of properties of-the driving mechanics of the motor vehicle, a density of traffic in an environment of the motor vehicle, a relative speed between the motor vehicle and the obstacle, and road conditions, whether an automatic braking action should be carried out and whether the automatic braking action should be carried out before, during and/or after a steering action is carried out in order to guide the motor vehicle along the evasion trajectory.

15. A method for operating a motor vehicle, comprising:
detecting automatically at least one obstacle using sensors on board the motor vehicle;
determining automatically a risk of frontal collision for a collision of the motor vehicle with the obstacle based on one or more of driving state data of the motor vehicle and environmental data of the motor vehicle;
determining automatically at least one evasion trajectory for mitigating or preventing the collision;
detecting automatically if the obstacle is another vehicle, which vehicle is approaching the motor vehicle;
determining, whether the risk of frontal collision is greater than a predefined first threshold value;
selectively determining whether a control action of a driver of the motor vehicle is guiding the vehicle along the determined evasion trajectory; and
selectively modifying the control action of the driver automatically such that the motor vehicle is guided along the determined evasion trajectory by the modified control action;
optimizing a probability of successful evasion and a driving stability of the motor vehicle during evasion; and
determining, depending on one or more of properties of driving mechanics of the motor vehicle, a density of traffic in an environment of the motor vehicle, a relative speed between the motor vehicle and the obstacle, and road conditions, whether an automatic braking action should be carried out and determining, when the automatic braking action should be carried out, relative to a steering action in order to guide the motor vehicle along the evasion trajectory.

* * * * *